United States Patent [19]

Pressley et al.

[11] 4,114,114

[45] Sep. 12, 1978

[54] APPARATUS AND METHOD FOR INITIATING ELECTRICAL DISCHARGE IN A LASER

[75] Inventors: Robert J. Pressley, Cupertino; Theodore S. Fahlen, San Jose, both of Calif.

[73] Assignee: GTE Sylvania Incorporated, Mountain View, Calif.

[21] Appl. No.: 773,826

[22] Filed: Mar. 3, 1977

[51] Int. Cl.² .............................................. H01S 3/097
[52] U.S. Cl. .............................. 331/94.5 PE; 315/336
[58] Field of Search ................... 331/94.5 G, 94.5 PE, 331/94.5 S, 94.5 D; 315/335, 336, 204

[56] References Cited

U.S. PATENT DOCUMENTS

| | | | |
|---|---|---|---|
| 3,721,915 | 3/1973 | Reilly | 331/94.5 PE |
| 3,772,610 | 11/1973 | Foster et al. | 331/94.5 G |
| 3,781,712 | 12/1973 | Judd | 331/94.5 G |
| 3,842,365 | 10/1974 | Hundstad et al. | 331/94.5 PE |

Primary Examiner—William L. Sikes
Assistant Examiner—Marcus S. Rasco
Attorney, Agent, or Firm—John F. Lawler

[57] ABSTRACT

An apparatus for initiating electrical discharge in a gas transport laser having two or more sets of electrodes comprises a pulse generator connected to both sets of electrodes. The pulse generator comprises an alternating current (AC) source connected to the primary windings of two transformers having secondaries connected to the sets, respectively of electrodes. By energizing the transformers after the application of a direct current (DC) voltage across the electrodes of each set, a discharge across the sets of electrodes occurs simultaneously for a balanced starting of the lasing action.

The invention also comprehends the method of starting a laser having a plurality of sets of electrodes consisting of the steps of applying a DC potential across each set of electrodes and transmitting at least one voltage pulse simultaneously to one of the electrodes of each set to produce simultaneously an electrical discharge between all sets of electrodes.

7 Claims, 2 Drawing Figures

APPARATUS AND METHOD FOR INITIATING ELECTRICAL DISCHARGE IN A LASER

BACKGROUND OF THE INVENTION

This invention relates to lasers and more particularly to a high power gas transport laser having a plurality of sets of electrodes.

A $CO_2$ gas transport laser that has been built and successfully used for producing continuous wave output power in the order of 1 and 2 KW is described in U.S. Pat. No. 3,772,610. Wide industrial application of such a laser has resulted in a need for higher output powers, i.e., in the order of 5 KW and above and to meet this need, two laser units of the type described in the foregoing patent have been connected in tandem with the optical axes of the units in alignment; the reflecting mirrors are mounted on the outer side walls of the units and the inner side walls have an opening through which the generated laser beam passes. A single high power beam is thus generated by connecting two separate laser apparatuses together in optical series.

The technique for starting the laser as described in the above patent is mountng a starter electrode close to the cathode and connecting that electrode to the source of anode voltage. As the voltage between cathode and anode is raised in order to start the discharge, a small discharge first forms between the starter electrode and the cathode. As the voltage is raised further, ions generated by this small discharge initiate the main discharge between cathode and the several resistively ballasted anode pads. At this point, the voltage immediately drops due to the addition of the much lower impedance path of the main discharge. Without this initial "starter" discharge, the voltage required to initiate the main discharge is very high.

While this starting technique works well with a single laser unit, it does not perform satisfactorily with two such units having cathodes electrically connected in parallel as required with the 5 KW laser. As the voltage is raised to initiate a two-cathode discharge, one cathode discharge invariably starts first due to unavoidable impedance differences of the two units. Thereafer, because the voltage immediately decreases as described above, the second cathode discharge is unable to start. This invention is directed to a solution of this problem.

An object of the invention is the provision of apparatus for initiating the discharge of a gas transport laser having two or more sets of electrodes.

A further object is the provision of a method of starting the discharge of a gas transport laser having two or more sets of electrodes.

These and other objects of the invention are achieved with a circuit for and a method of applying a pulse or pulses of energy simultaneously to one electrode of each set of electrodes while a DC potential is applied across those electrodes.

DESCRIPTION OF PREFERRED EMBODIMENTS

Figure 1:
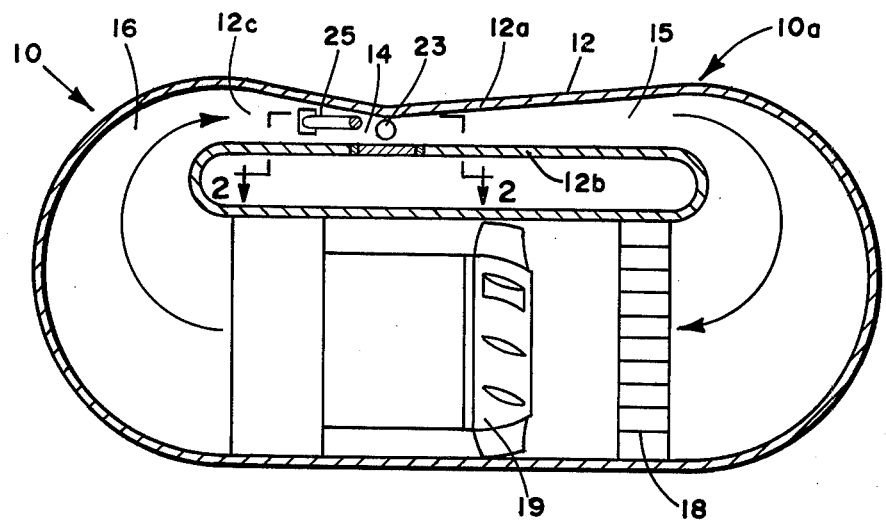
FIG. 1 is a schematic vertical section of one of two sections of a closed cycle gas transport laser embodying the invention.
Figure 2:
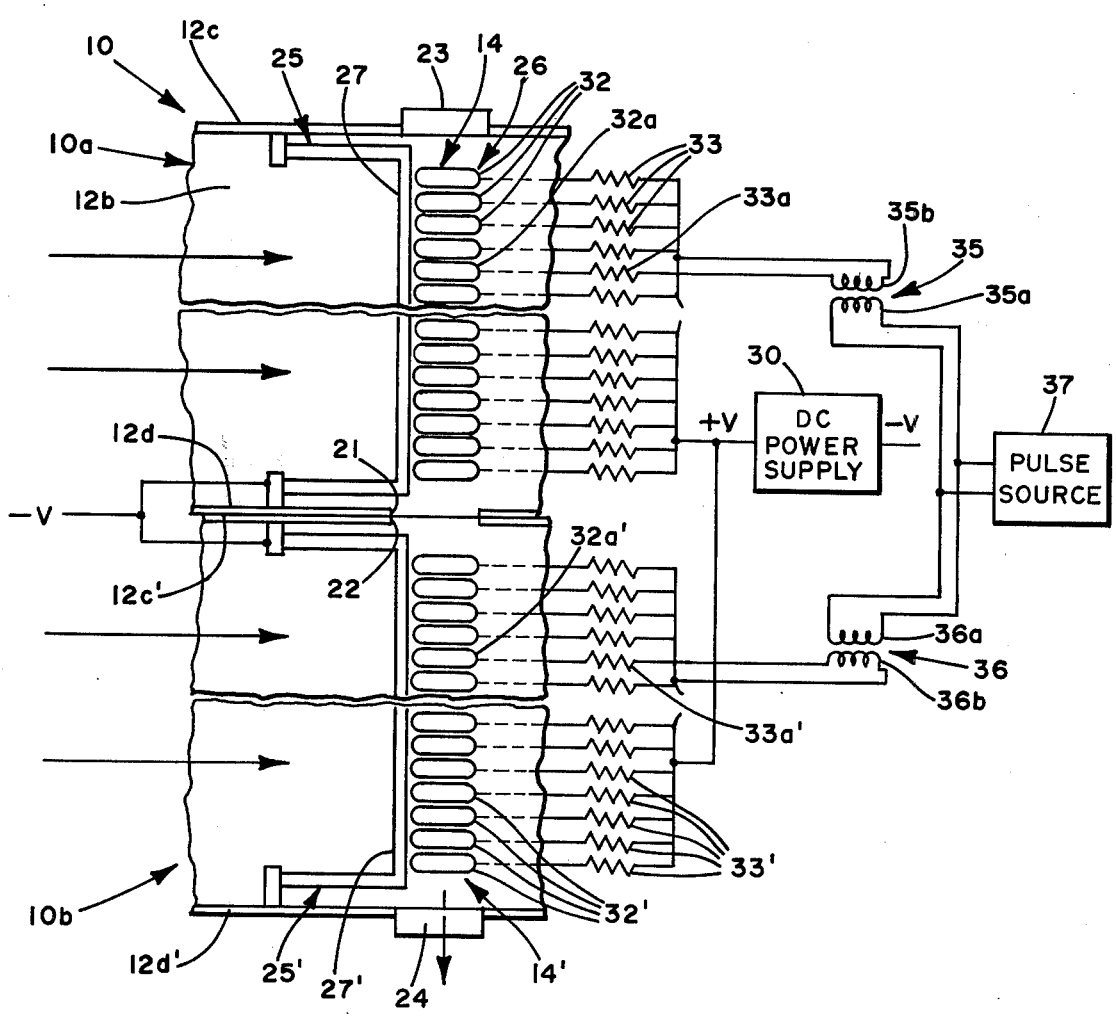
FIG. 2 is an enlarged view of the lasing region of both sections of the laser showing the electrode arrangement, the view being taken on line 2—2 of FIG. 1.

Referring now to the drawings, FIG. 1 is a schematic representation of a two-section closed cycle high power gas transport laser system 10, only one of the sections, namely, section 10a being shown in the drawing. The other section 10b, part of which is shown in FIG. 2, is substantially identical in construction to section 10a except that the sections are mirror images of each other. Accordingly it will be sufficient for an understanding of this invention that only one of the sections is described, like parts being indicated by the primes of like reference characters on the drawings.

Section 10a comprises duct or channel 12 with a top wall 12a, a bottom wall 12b and side walls 12c and 12d generally configured to define a closed fluid path through which a gas mixture is recirculated in the direction of the arrows. The channel has a rectangular cross-sectional shape with a narrow or throat section 14 defining the lasing or discharge zone of the system, a diffuser portion 15 on the downstream side of this zone in which the gas velocity is reduced and a nozzle portion 16 upstream from the discharge zone in which the gas velocity is increased prior to entering the throat. The remainder of section 10a includes a heat exhanger 18 which removes heat from the gas flowing through it and a blower 19 which circulates the gas through the channel.

The gas mixture used in this system preferably consists of helium, nitrogen and carbon dioxide in well known proportions that support lasing action in discharge zone 14 to produce coherent light at 10.6 microns.

Sections 10a and 10b are secured together in side-by-side relation, see FIG. 2, with inner side wall 12d of section 10a adjacent to inner side wall 12c' of section 10b. Openings 21 and 22 in adjacent side walls 12d and 12c', respectively, are aligned with each other and with discharge zones 14 and 14' of the two sections providing an optical window for the laser beam. Mounted on outer side walls 12c and 12d' of sections 10a and 10b, respectively, in alignment with the discharge zones are a totally reflecting mirror 23 and a partially transmitting mirror 24, respectively, between which a laser beam generated in the discharge zones is reflected and passes through window openings 21 and 22 of the adjacent walls. In practice, mirrors 23 and 24 are constructed so as to reflect a coherent beam several times through the discharge zones of sections 10a and 10b before the beam exits as an output from mirror 24, as indicated by the arrow, thus increasing the effective length of the laser without increasing the physical size.

The electric discharge in the lasing region 14 of section 10a extends between a set of electrodes comprising cathode 25 and anode 26. Cathode 25 is a hollow tubular conductor having a discharge supporting portion 27 spaced inwardly from the top wall 12a and extending perpendicular to the direction of flow of gas in the channel. Cathode portion 27 preferably is of the type described and claimed in copending application Ser. No. 699,628 now U.S. Pat. No. 4,058,778 of T. S. Fahlen et al assigned to the assignee of this invention. Cathodes 25 and 25' of sections 10a and 10b, respectively, are connected in parallel to the negative terminal −V of an external direct current power supply 30. A coolant from a source, not shown, is pumped through the cathode and around the anode.

Anode 26 consists of a plurality of segments or pads 32 mounted in bottom wall 12b in a row generally parallel to and coextensive with the transverse portion 27 of the cathode. Pads 32 are electrically insulated from each other and are disposed downstream from the cathode in general alignment with the mirror system to support an electrical glow discharge in the lasing region. Pads 32 are electrically connected to the positive terminal +V of power supply 30 through ballast resistors 33 as shown which respectively limit the current carried by the pads.

In order to start the two-unit laser, transformers 35 and 36 are connected between a pulse source 37, such as alternating current (AC) power supply, and pads 32a and 32a', respectively, through associated ballast resistors 33a and 33a'. The primary windings 35a and 36a of these transformers are connected in parallel to generator 37 while the secondary windings 35b and 36b are connected to pads 32a and 32a', respectively. A voltage pulse or series of pulses or even an AC voltage from source 37 is thus applied simultaneously to both sets of electrodes through the anodes to enable simultaneous initiation of the primary discharge currents in the gases of the discharge zones of the two laser sections.

Laser 10 started in the following manner. A relatively high DC potential sufficient to sustain a discharge across the electrodes when the discharge has been initiated but insufficient to start the discharge is applied across the electrodes of both laser sections 10a and 10b by power supply 30. Thereafter a pulse or pulses of voltage from source 37 is applied simultaneously to both anodes through transformers 35 and 36 triggering the electrical breakdown in both discharge zones. The voltage from source 37 may then be removed.

In addition to use of an AC signal in this manner to start the operation of a multiple unit laser apparatus, such signal may be continuously applied to the electrodes during laser operation with provision being made to permit adjustment of the magnitude and phase of the signal. The effect of such signal is to buck out residual laser ripple. Since transformers 35 and 36 handle only a small portion of the laser discharge current on a continuous basis, there is minimal effect on the laser and transformers.

What is claimed is:

1. High power gas transport laser apparatus comprising
    a pair of juxtaposed sections, each section comprising
        a channel defined by top and bottom walls and side walls,
        a gas mixture comprising carbon dioxide in said channel,
        means for moving said gas mixture in one direction through said channel,
        electrodes for producing an electric discharge in said gas mixture transversely of the direction of gas flow comprising
            a tubular cathode between said top and bottom walls and extending in a second direction transversely of said one direction, and
            an anode coextensive with said cathode and comprising a plurality of electrically conductive pads electrically insulated from each other and arranged in a row extending in said second direction, said anode being vertically spaced from said cathode and defining therebetween a discharge zone,
    said sections being disposed with a side wall of one channel adjacent to a side wall of the other with the other side walls remotely spaced apart, said rows of anode pads being in alignment,
    said adjacent side walls having optical windows therein aligned with each other and with the discharge zone in each of said channels,
    an optical resonant cavity comprising mirrors adjacent to said other side walls, respectively, and optically aligned with each other and with said windows for reflecting a beam of coherent light therebetween and through the windows,
    a source of DC voltage connected across said anodes and cathodes, and
    means for applying at least one pulse of energy simultaneously to one of said electrodes in each section while the cathode and anodes are biased by said DC source whereby to initiate said discharge simultaneously in both channels.

2. Apparatus according to claim 1 in which said pulse applying means comprises transformer means.

3. Apparatus according to claim 1 in which said pulse applying means is connected to at least one pad of each anode.

4. Apparatus according to claim 3 in which said pulse applying means comprises a source of AC voltage and transformer means connected thereto.

5. Apparatus according to claim 4 in which said transformer means comprises a transformer for each of said anodes, said transformers having primary windings connected to said AC voltage source and secondary windings connected to said pads of the respective anodes.

6. Laser apparatus comprising at least two juxtaposed sections, each of said sections having two electrodes defining therebetween a discharge zone, said discharge zones being laterally aligned,
    means to apply a DC voltage across said electrodes,
    an optical resonant cavity comprising mirror means mounted on said sections in alignment with said discharge zones,
    a gas mixture in said sections,
    means for moving the gas mixture in each section through the discharge zone thereof whereby coherent light is generated and reflected by said mirror means when said DC voltage applied across the electrodes of each chamber produces an electrical discharge in said gas mixture, and
    means for simultaneously initiating said discharge in both sections comprising
        pulse generator means connected in parallel to one of said electrodes in each section.

7. Apparatus according to claim 6 in which said pulse generator means comprises a source of AC voltage and transformer means connected between said source and said one electrode in each section.

* * * * *